（12）United States Patent
Schoepf

(10) Patent No.: US 7,364,036 B2
(45) Date of Patent: Apr. 29, 2008

(54) MODULE FOR A PERFORATED FLAT TOP BELT WITH HINGE GAP FOR BETTER FLUID FLOW

(75) Inventor: Alex Schoepf, Reinach (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/350,503

(22) Filed: Feb. 9, 2006

(65) Prior Publication Data
US 2007/0181408 A1   Aug. 9, 2007

(51) Int. Cl.
B65G 17/06   (2006.01)

(52) U.S. Cl. .................. 198/853; 198/850; 198/851; 198/852

(58) Field of Classification Search ......... 198/850–853
See application file for complete search history.

(56) References Cited

U.S. PATENT DOCUMENTS

| 4,688,670 | A |   | 8/1987 | Lapeyre |
| 5,096,053 | A |   | 3/1992 | Hodlewsky |
| 5,125,504 | A |   | 6/1992 | Corlett et al. |
| 5,174,439 | A | * | 12/1992 | Spangler et al. ............ 198/853 |

(Continued)

FOREIGN PATENT DOCUMENTS

EP   0 831 038 A1   3/1998

(Continued)

OTHER PUBLICATIONS

REXNORD: "Product Catalogue 2006/2007 Tabletop and Mattop Chains" 2006, REXNORD, XP002430591 p. 79.

*Primary Examiner*—Douglas A Hess
(74) *Attorney, Agent, or Firm*—Hodgson Russ LLP

(57) ABSTRACT

A belt module comprising an intermediate section having a top surface. A first plurality of link ends have opposed side walls that provide the first link ends with a first transverse thickness. The transverse thickness is connected to the intermediate section at a first proximal portion and extends from the intermediate section in a direction of belt travel to a first distal portion at the link ends. The first link ends have a first opening through the thickness between and to the opposed side walls. The first opening is disposed transverse to the direction of belt travel. The belt module also includes a second plurality of link ends having opposed side walls providing the second link ends with a second transverse thickness. The second transverse thickness is connected to the intermediate section at a second proximal portion and extends from the intermediate section in a direction opposite to the first link ends to a second distal portion at the link ends. The second link ends have a second opening through the thickness between and to the opposed side walls. The second opening is disposed transverse to the direction of belt travel. At least one link end of the first and second plurality of link ends has a vent defined therein at the distal portion.

5 Claims, 12 Drawing Sheets

U.S. PATENT DOCUMENTS

| | | | |
|---|---|---|---|
| 5,253,749 A | 10/1993 | Ensch | |
| 5,305,869 A * | 4/1994 | Damkjaer | 198/689.1 |
| 5,339,946 A | 8/1994 | Faulkner et al. | |
| 5,379,883 A * | 1/1995 | Damkjaer | 198/853 |
| 5,551,356 A * | 9/1996 | Post | 110/269 |
| 5,727,451 A * | 3/1998 | DeMars | 99/386 |
| 5,921,379 A * | 7/1999 | Horton | 198/852 |
| 6,006,898 A | 12/1999 | Odink | |
| 6,247,582 B1 | 6/2001 | Stebnicki et al. | |
| 6,467,610 B1 * | 10/2002 | MacLachlan | 198/699.1 |
| 2001/0050214 A1 | 12/2001 | Guldenfels | |
| 2002/0117382 A1 | 8/2002 | Maine, Jr. | |
| 2003/0192777 A1 | 10/2003 | Guldenfels | |
| 2005/0230294 A1 * | 10/2005 | Seidl | |

FOREIGN PATENT DOCUMENTS

EP     0 976 668 A2     2/2000

* cited by examiner

MODULE FOR A PERFORATED FLAT TOP BELT WITH HINGE GAP FOR BETTER FLUID FLOW

FIELD OF THE INVENTION

The present invention relates to conveyor belts and, more particularly, to modular plastic conveyor belts formed of rows of plastic belt modules pivotally interlinked by transverse pivot rods.

BACKGROUND OF THE INVENTION

Modular belts are used in various configurations such as open grid-like structures or closed flat surfaces such as flat top belts. Flat top belts are also produced with perforations in the top surface. The flat plates of these belt modules can have holes or openings of various sizes. The purpose of the openings or holes is the draining of fluids (e.g., water) while transporting wet products such as vegetables.

In some specific applications the same openings and perforations in the flat top belt are used for blowing air from the bottom of the belt through the holes or openings to the surface where the wet goods are supported and conveyed.

The holes or openings are dimensioned to allow draining of fluids but are small enough to prevent pieces of the product from falling through the belt. This perforated flat top design is used primarily for small products such as beans for which large open flush grid belts are not suitable. While the holes or openings provide the optimal draining property on the belt module surface between the hinges, the hinge area is closed on its top side.

It is also common on such belts to open the link on the bottom side of the flat top belt in order to make cleaning of the hinge area easier for sanitary purposes. The top of the link remains closed to keep the support surface flat and to prevent debris from entering the hinge area. The tight hinge design leads to a significant reduction of the draining capability in the hinge area. Because the hinge area is not perforated, the goods positioned on the hinge are not reached by the air flow and tend to remain wet.

Accordingly, there is a need for a perforated flat top modular belt that allows the goods to dry equally in the hinge area.

SUMMARY OF THE INVENTION

The present invention meets the above-described need by providing a belt module comprising an intermediate section having a top surface. A first plurality of link ends have opposed side walls that provide the first link ends with a first transverse thickness. The transverse thickness is connected to the intermediate section at a first proximal portion and extends from the intermediate section in a direction of belt travel to a first distal portion at the link ends. The first link ends have a first opening through the thickness between and to the opposed side walls. The first opening is disposed transverse to the direction of belt travel. The belt module also includes a second plurality of link ends having opposed side walls providing the second link ends with a second transverse thickness. The second transverse thickness is connected to the intermediate section at a second proximal portion and extends from the intermediate section in a direction opposite to the first link ends to a second distal portion at the link ends. The second link ends have a second opening through the thickness between and to the opposed side walls. The second opening is disposed transverse to the direction of belt travel. At least one of the first plurality of link ends, second plurality of link ends, and intermediate section has a vent defined therein at the distal portion.

In another embodiment of the invention, the module includes at least one intermediate section vent disposed on the intermediate section at the portion that borders the space between adjacent link ends on the same module.

In yet another embodiment of the invention, the module includes vents at the distal portions of the link ends and at the portion of the intermediate section bordering the space between adjacent link ends on the same module.

In another alternate embodiment, the module includes vents located on the side of the link ends.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
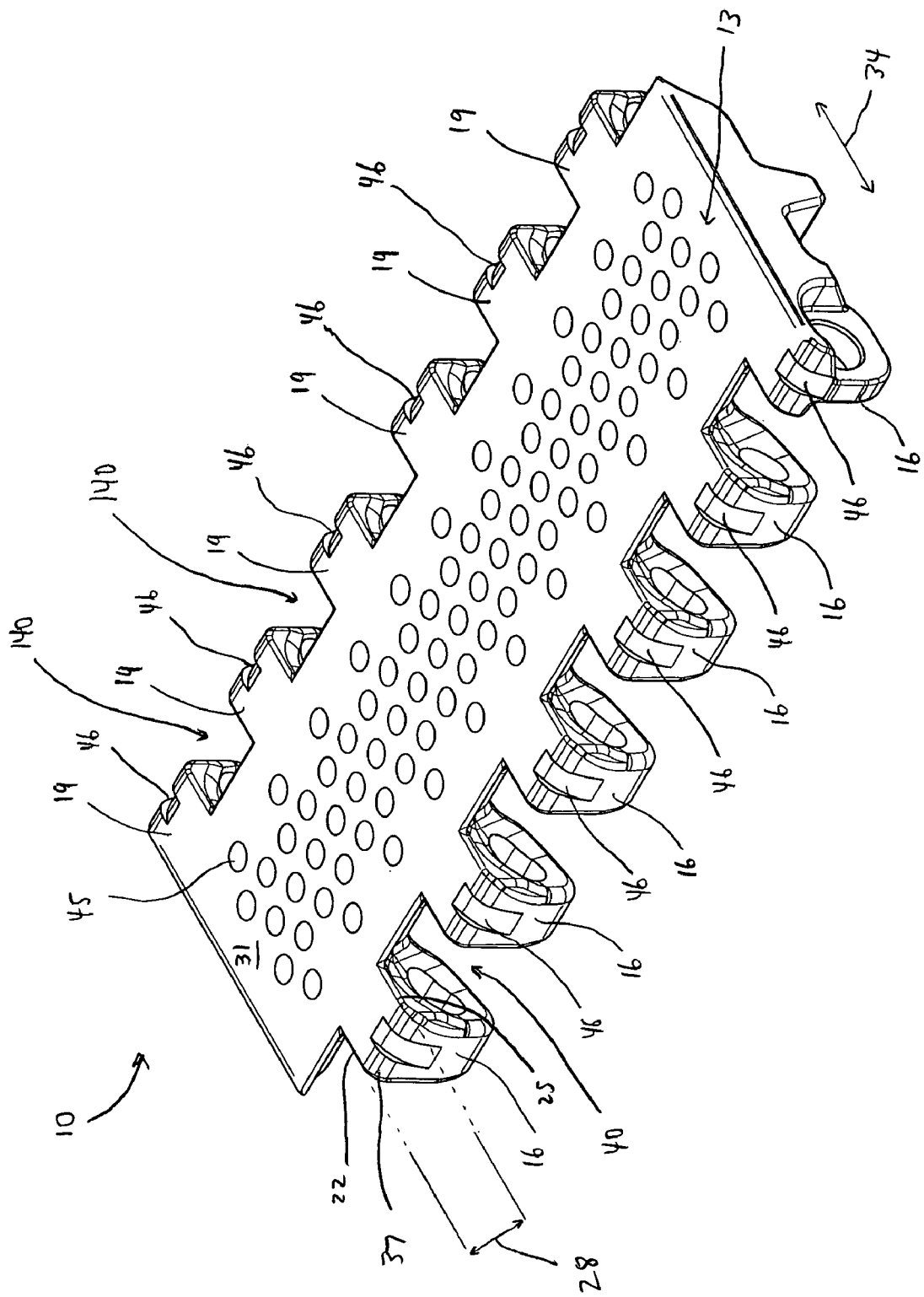
FIG. 1 is a perspective view of a perforated flat top module of the present invention with a vented hinge shown with vents located at the distal end of the link ends.
Figure 2:
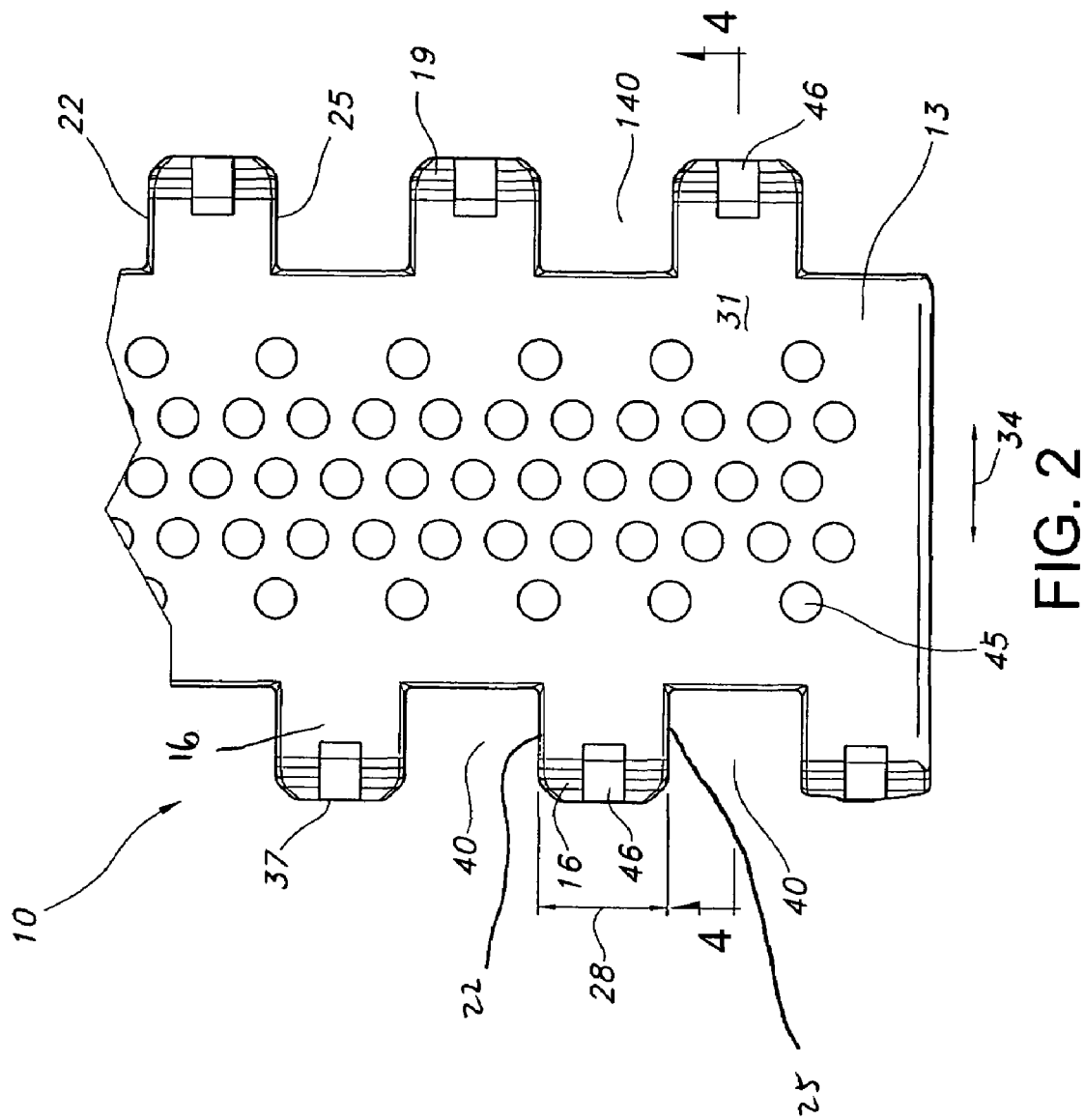
FIG. 2 is a top plan view of a section of a perforated flat top belt module of the present invention with a vented hinge shown with vents located at the distal end of the link ends.
Figure 3:
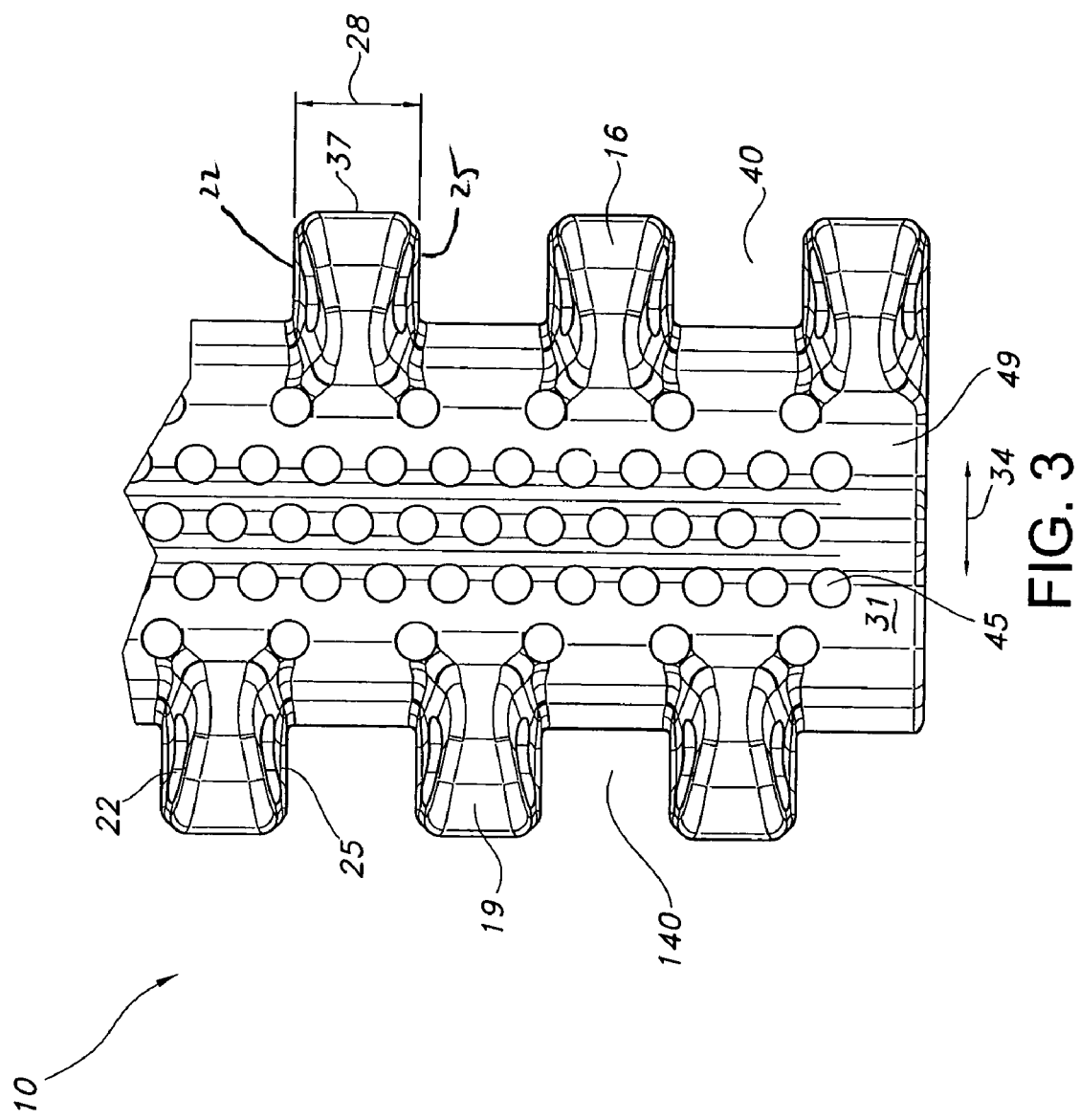
FIG. 3 is a bottom plan view of the section of the belt module shown in FIG. 2.
Figure 4:
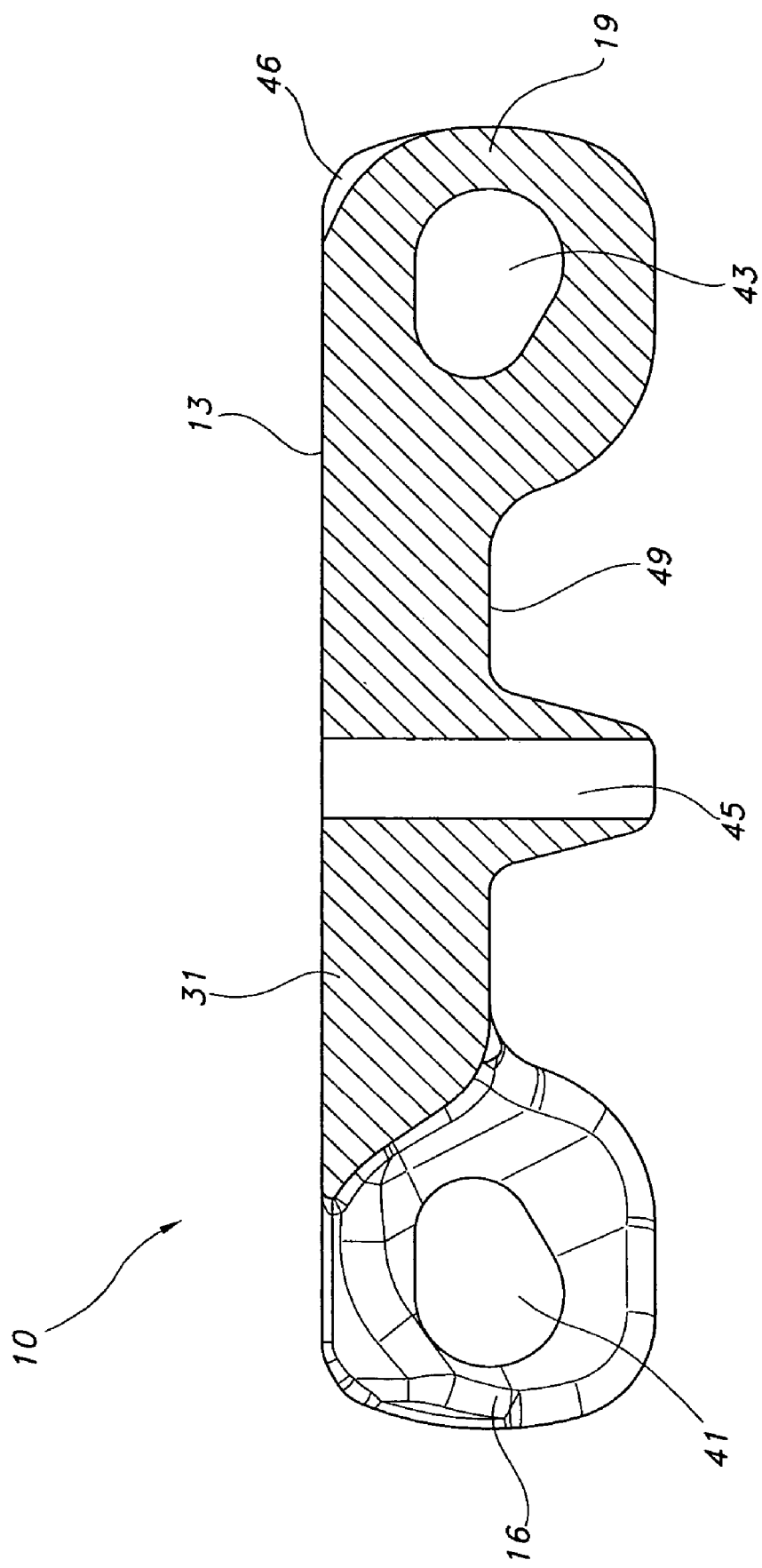
FIG. 4 is a cross-sectional view taken along line 4-4 of FIG. 2.

Referring to FIGS. 1-12 generally and initially to FIGS. 1 through 4, the belt module 10 of the present invention includes a top surface 13 of the module 10. The module 10 has a first plurality of link ends 16 and a second plurality of link ends 19 disposed opposite from the first link ends 16. The first plurality of link ends 16 have opposed side walls 22, 25 that form a transverse thickness 28 connected to an intermediate section 31. The transverse thickness 28 extends in a direction of belt travel 34 from the intermediate section 31 to a first distal portion 37. The second plurality of link ends 19 have similar geometry to the first link ends 16 except they extend in the opposite direction. As will be evident to those of ordinary skill in the art based on this disclosure, the belt module 10 may be driven in either direction along arrow 34.

The link ends 16 and 19 are offset in a direction transverse to the direction of belt travel 34. Accordingly, adjacent modules 10 can be positioned such that the link ends 16 fit into the spaces 140 disposed between adjacent link ends 19, and link ends 19 fit into the spaces 40 disposed between adjacent link ends 16. A portion of the intermediate section 31 borders the spaces 40 and 140. The link ends 16, 19 have transverse openings 41 and 43 (FIG. 4) that extend through the transverse thickness 28 between and to the opposed side walls 22, 25. As will be evident to those of ordinary skill in the art, modules 10 can be positioned such that link ends 16 and 19 are intercalated with the link ends 16 and 19 of an adjacent module 10. The side-by-side and intercalated modules 10 can then be connected by pivot rod 100 (FIG. 9) to provide an endless belt capable of articulating about a sprocket (not shown) to form a conveying system.

Module 10 may be formed out of plastic or other materials suitable for many applications including conveying of food products. The material may be lightweight, non-corrosive, and easily cleaned. The module 10 may be thermoformed from a plastic resin raw material as known to those of ordinary skill in the art.

Intermediate section 31 has a top surface 13 that may have a substantially rectangular shape in plan view. The intermediate section 31 may have perforations 45 located thereon that allow a fluid to pass from the top surface 13 through to a bottom surface 49 and exit the bottom surface 49 or vice versa. The perforations 45 may be oriented generally orthogonally to the top surface 13, bottom surface 49 and the direction of belt travel indicated by arrow 34. Additionally, the perforations 45 may be of any shape, size or number so as to accommodate a desired flow of fluid through the intermediate section 31.

The link ends 16, 19 have link end vents 46 formed integrally thereon. The link end vents 46 may comprise grooves, channels, or depressions either molded or created by removing material from the module and extending to the distal portion 37 of the link ends 16, 19. The vents 46 are capable of allowing fluid to pass through the belt (fluid to pass from the top surface 13 through to a bottom surface 49 and exit the bottom surface 49, or vice versa). The link end vents 46 may be oriented in a direction generally parallel to the direction of belt travel as indicated by arrow 34.

Figure 5:
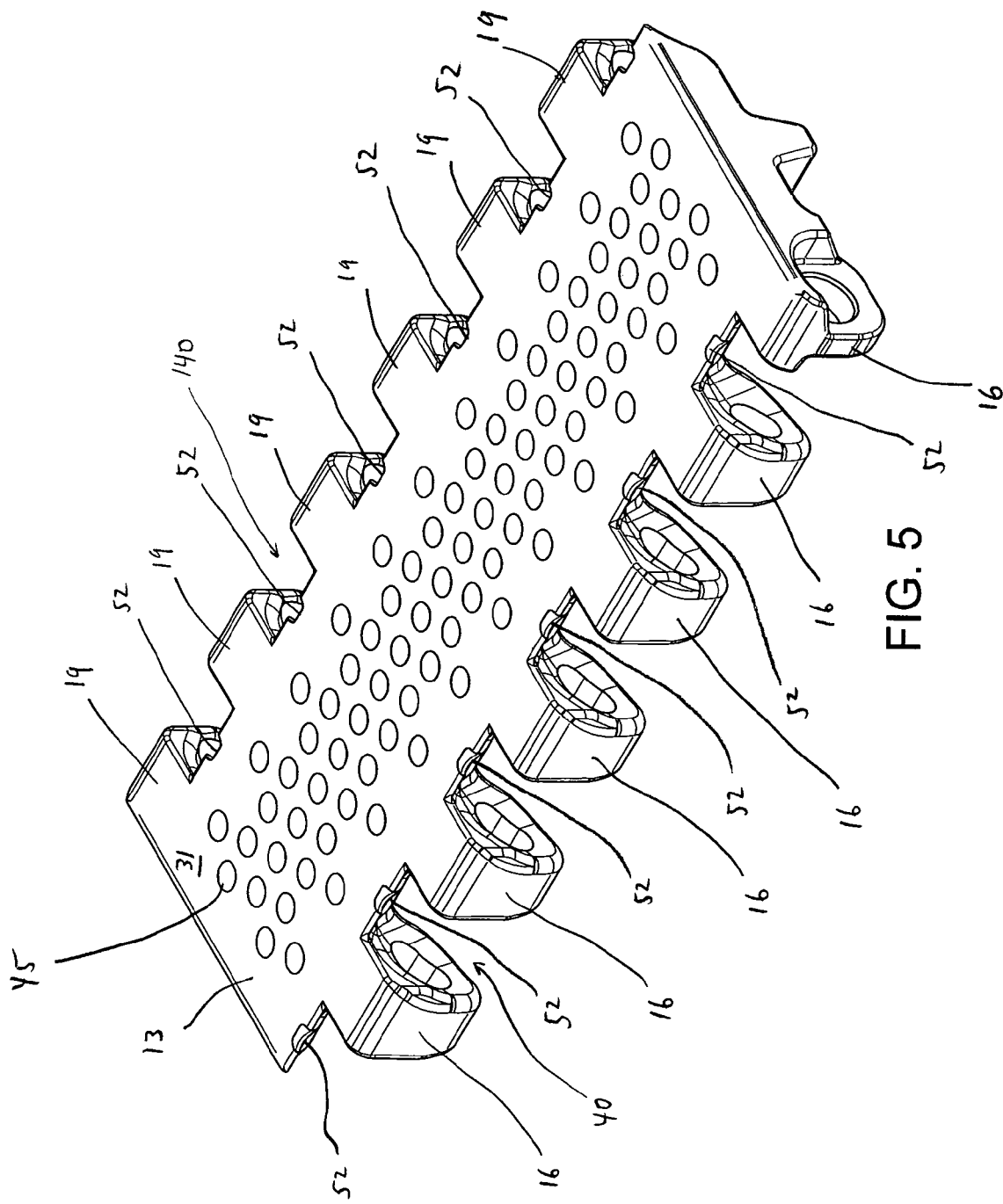
FIG. 5 is a perspective view of a section of a perforated flat top belt module with a vented hinge shown with vents on the intermediate section.
Figure 6:
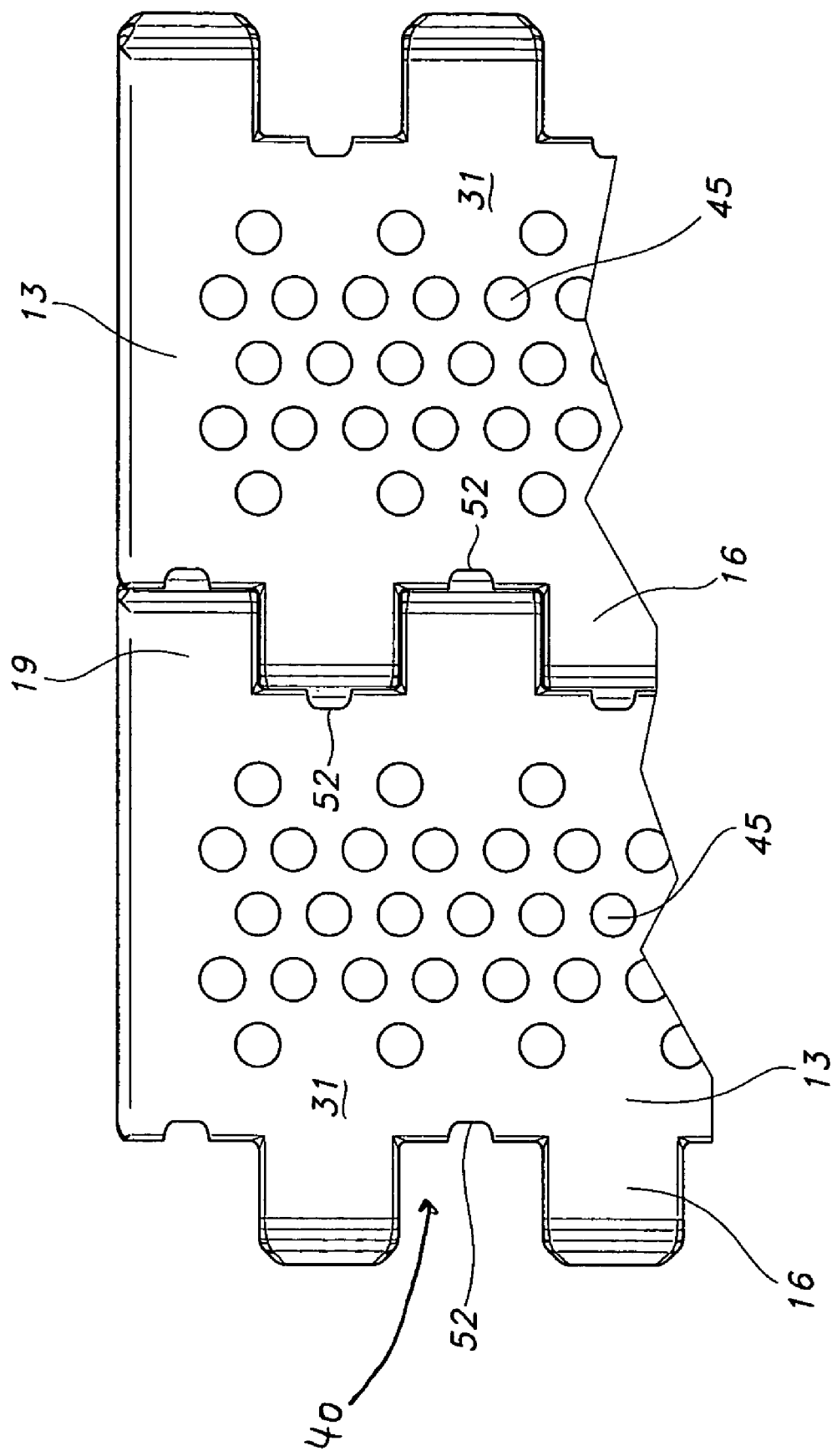
FIG. 6 is a top plan view of a portion of two assembled flat top modules with vented hinges shown with vents on the intermediate section.

In an alternative embodiment of the invention as shown in FIGS. 5-6, the intermediate section 31 may be provided with intermediate section vents 52 that are disposed adjacent to the spaces 40 between the link ends 16. Intermediate section vents 52 may comprise grooves, channels, or depressions created by molding or removing material from the module in the intermediate section 31. The vents 52 allow fluid to pass from the top surface 13 to the bottom surface 49 or vice versa. The vents 52 may also be located between link ends 19. As shown in FIG. 6, the vents 52 are disposed in the hinge area of an assembled belt and provide a passageway for fluids.

Figure 7:
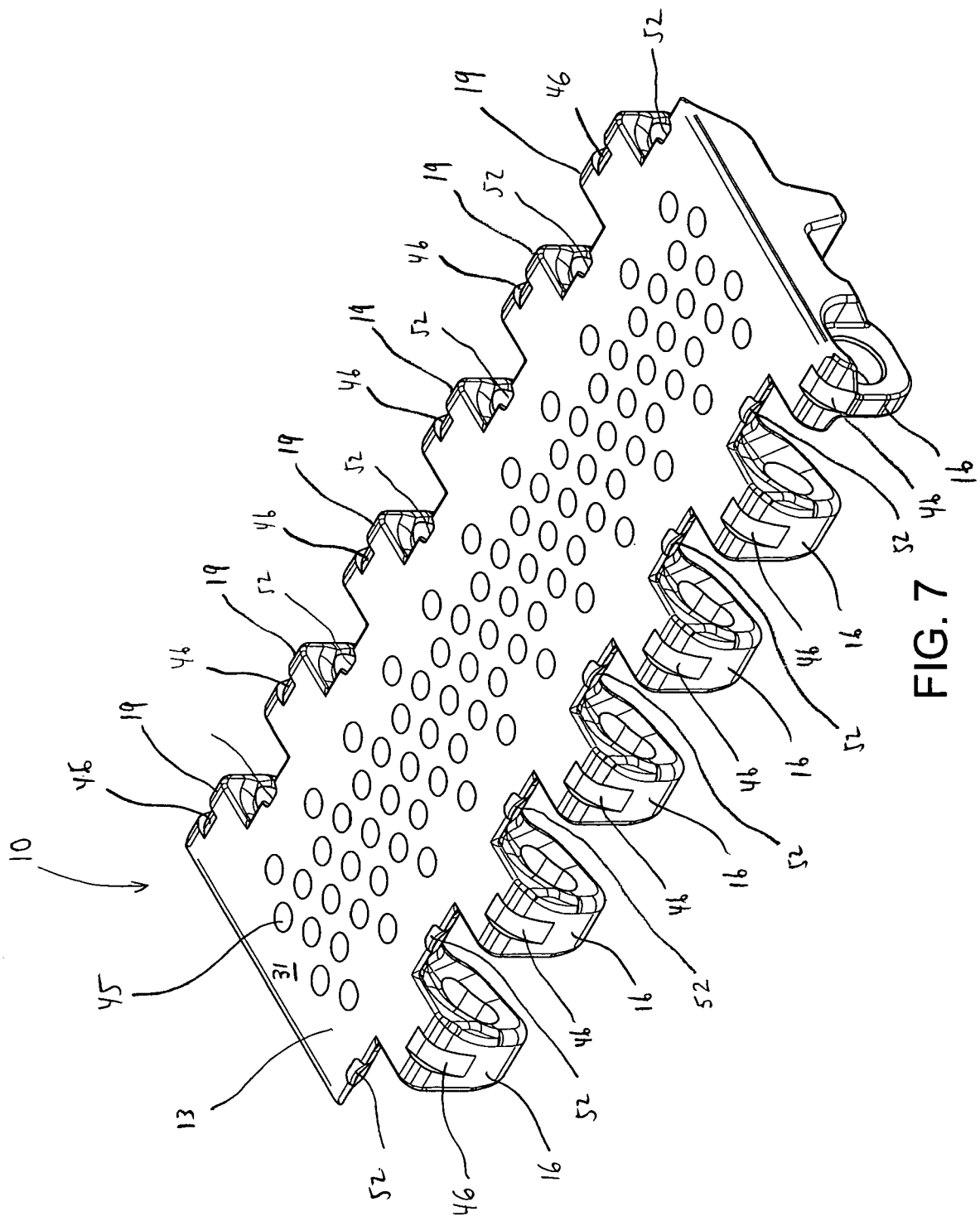
FIG. 7 is a perspective view of a perforated flat top module with a vented hinge shown with vents on the link ends and on the intermediate section.
Figure 8:
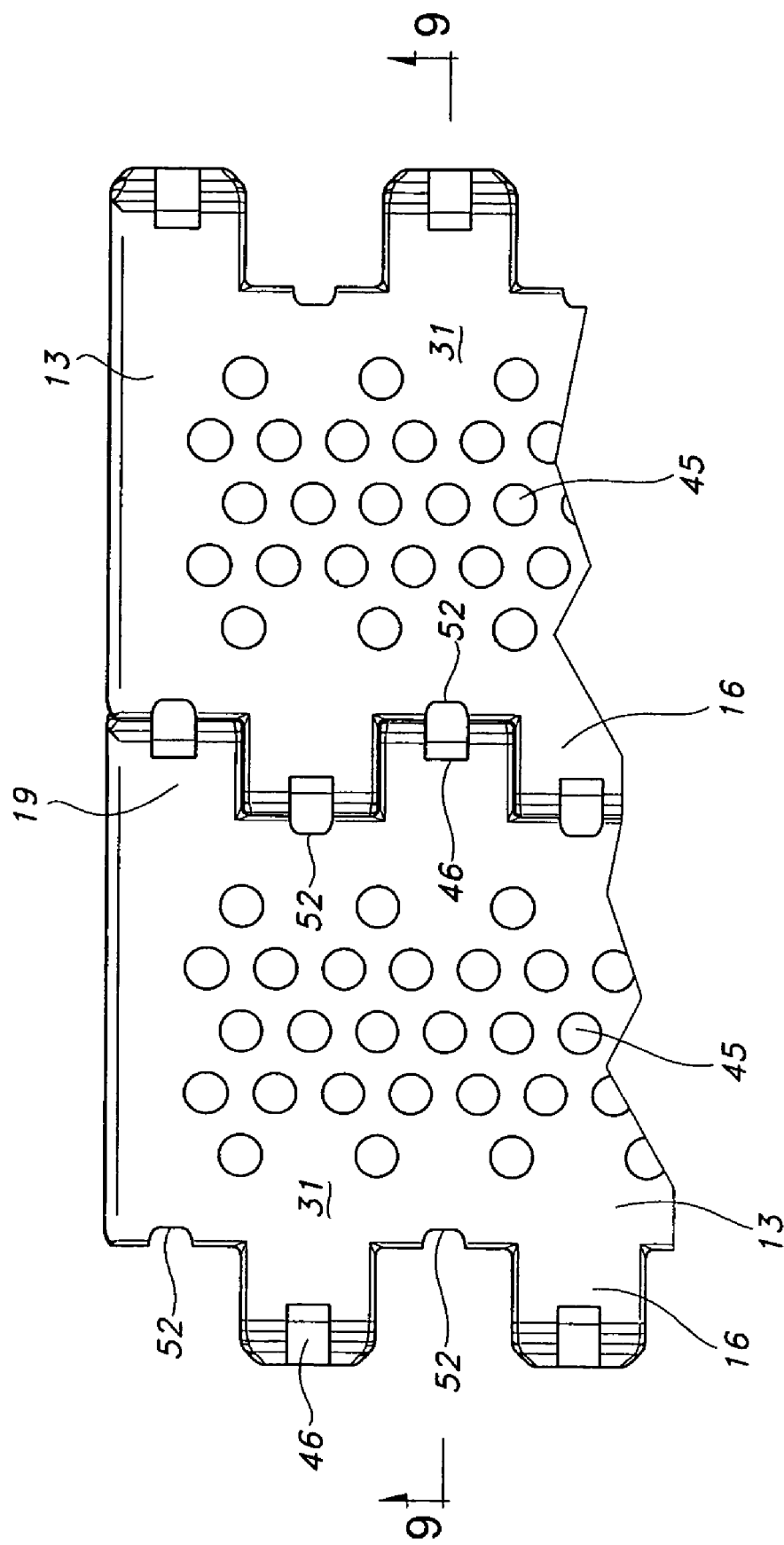
FIG. 8 is a top plan view of a portion of two assembled flat top modules with a vented hinge shown with vents on the link ends and the intermediate section.
Figure 9:
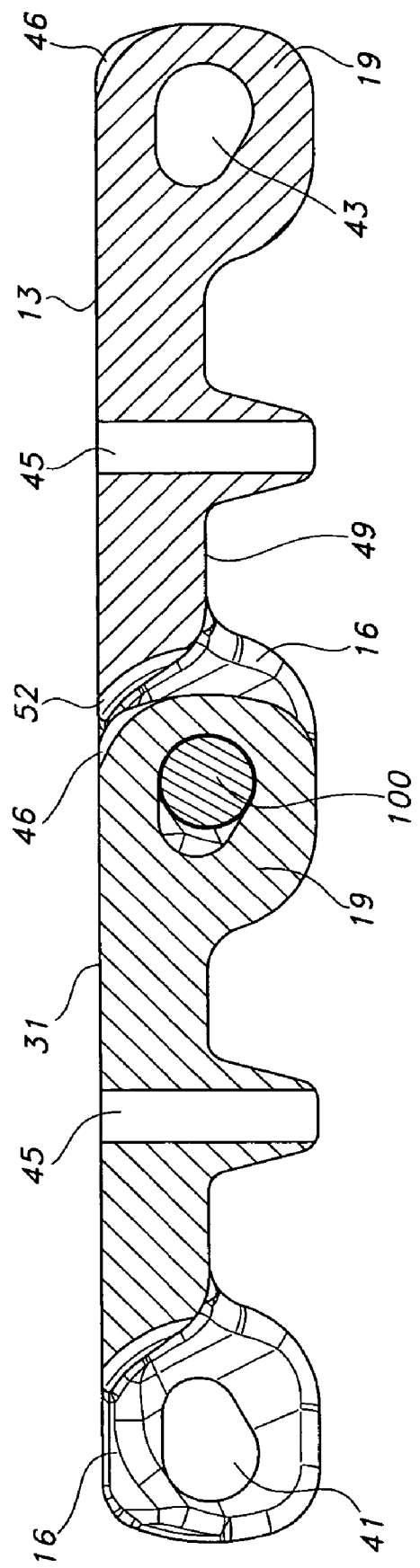
FIG. 9 is a cross-sectional view taken along lines 9-9 of FIG. 8.

Turning to FIGS. 7-9, another embodiment of the invention includes both link end vents 46 and intermediate section vents 52. The vents 46 and 52 may be disposed on module 10 such that when adjacent modules are connected to form a belt, the link end vents 46 and the intermediate section vents 52 may align to provide even greater fluid passing capability.

Figure 10:
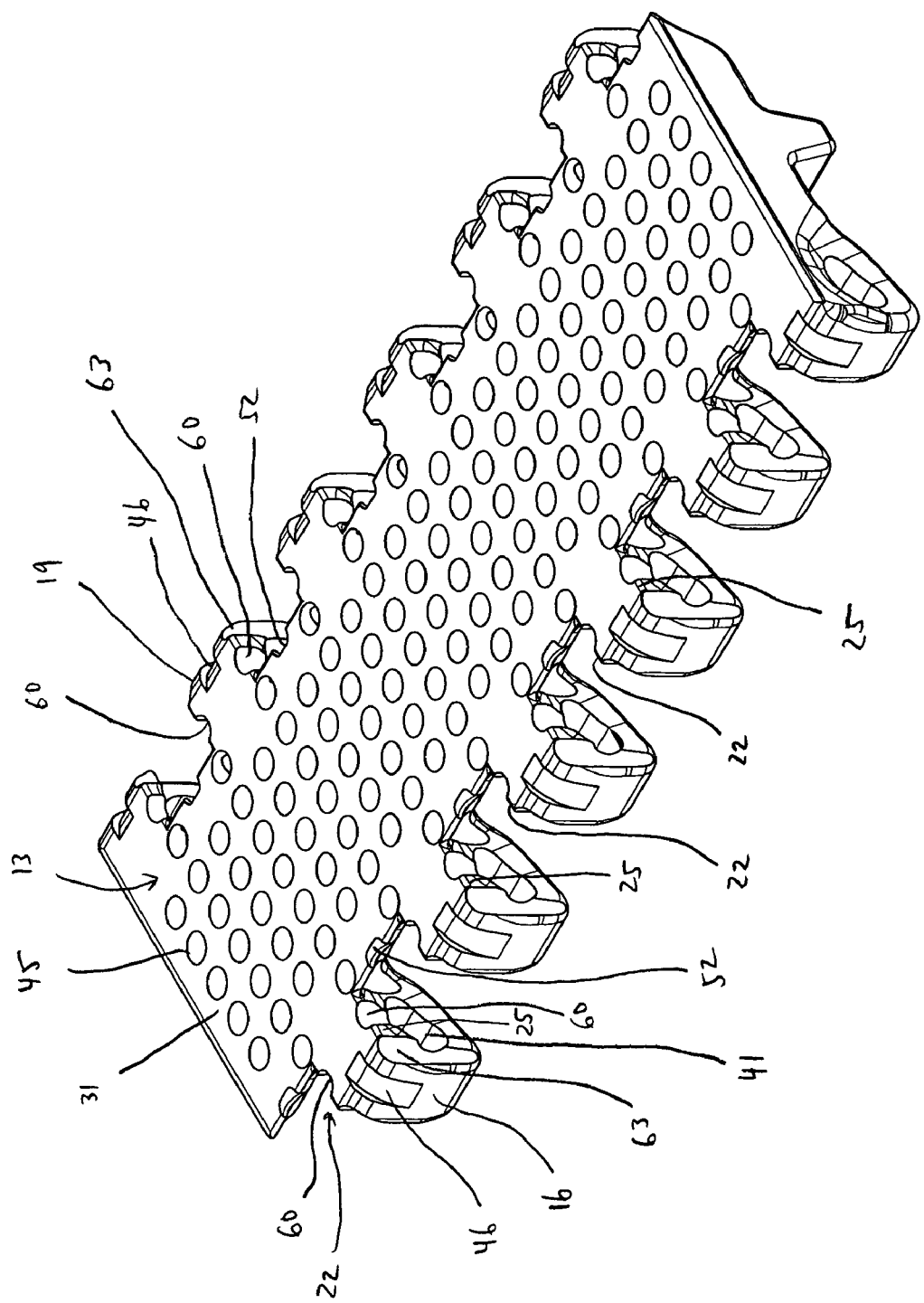
FIG. 10 is a perspective view of a perforated flat top module with a vented hinge shown with vents on the link ends at the distal end and the side and with vents on the intermediate section.
Figure 11:
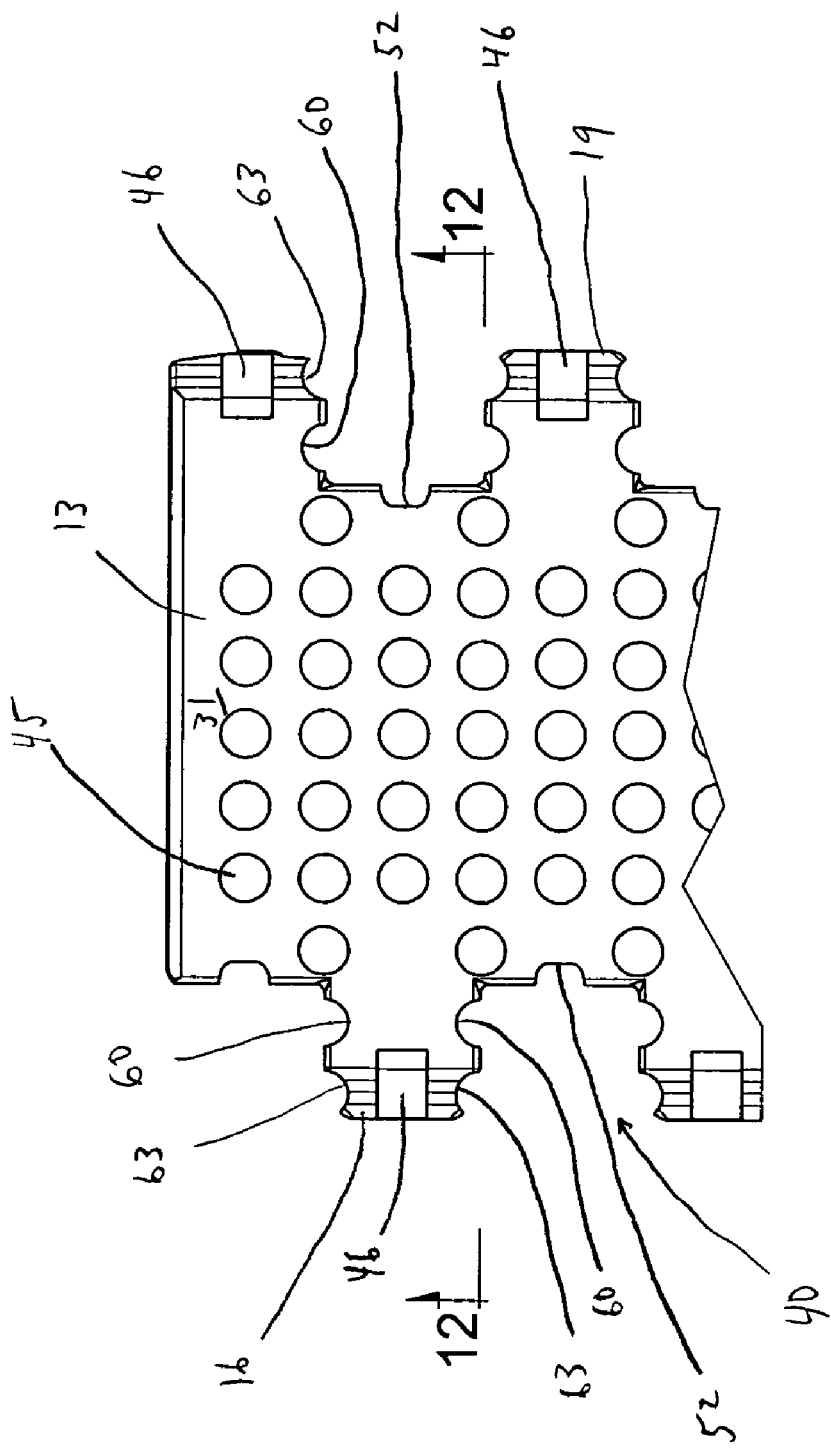
FIG. 11 is a top plan view of a portion of the flat top module shown in FIG. 10; and, FIG. 12 is a cross-sectional view taken along lines 12-12 of FIG. 11.
Figure 12:
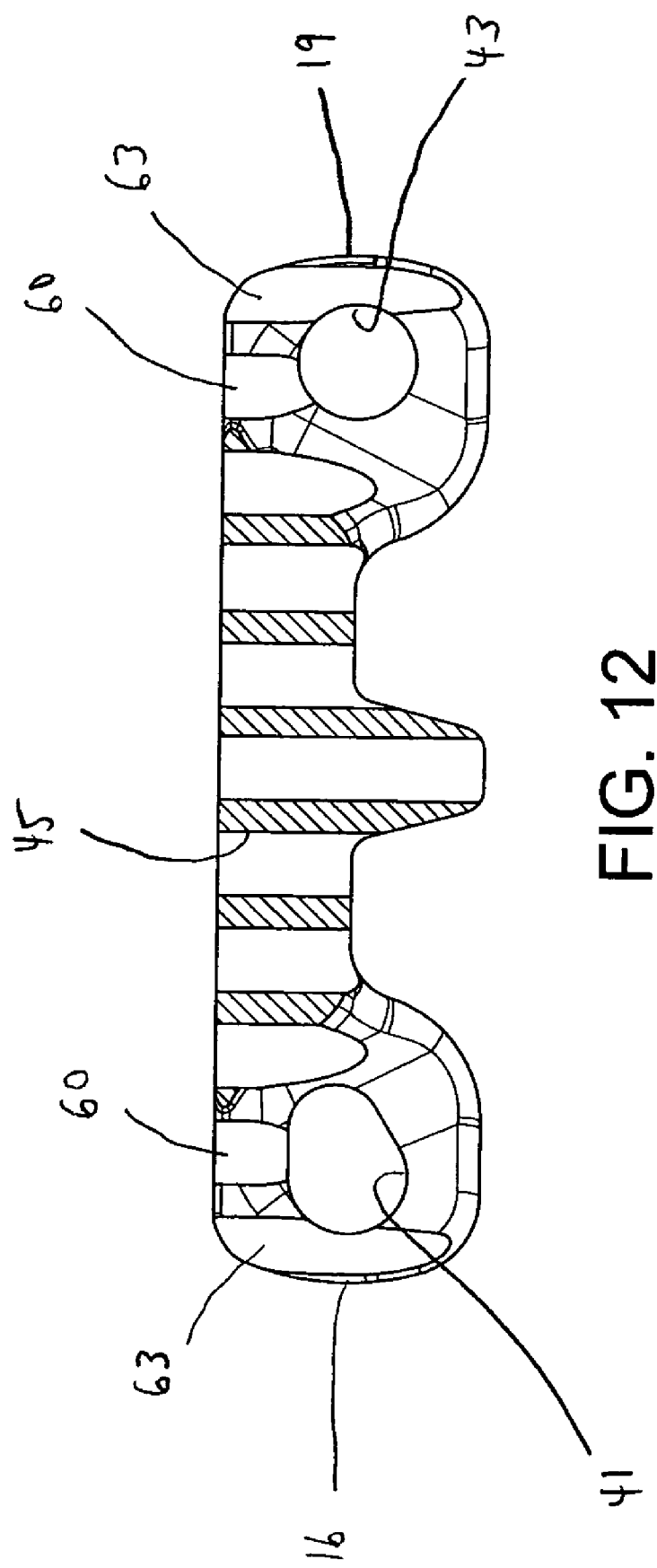

Turning to FIGS. 10-12, another embodiment of the present invention includes vents 60 and 63 formed in the sidewalls 22, 25 of link ends 16, 19. Vent 60 is located closer to the intermediate section 31. Vent 63 is formed toward the distal end 37 of link end 16. As shown, these vents may be combined with vents 46 and 52 to provide numerous passageways for the flow of liquids or air through the assembled belt.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, comprising:
   a) an intermediate section having a top surface;
   b) a first plurality of link ends having opposed side walls providing the first link ends with a first transverse thickness connected to the intermediate section at a first proximal portion and extending from the intermediate section in a direction of belt travel to a first distal portion at the link ends, wherein the first link ends have a first opening through the thickness between and to the opposed side walls, the first opening being disposed transverse to the direction of belt travel;
   c) a second plurality of link ends having opposed side walls providing the second link ends with a second transverse thickness connected to the intermediate section at a second proximal portion and extending from the intermediate section in a direction opposite to the first link ends to a second distal portion at the link ends, wherein the second link ends have a second opening through the thickness between and to the opposed side walls, the second opening being disposed transverse to the direction of belt travel; and,
   d) wherein one of the first plurality of link ends, the second plurality of link ends, and the intermediate section, has a vent defined therein; wherein a portion of the intermediate section bordering a space between adjacent link ends has a vent defined therein such that the vent is capable of aligning with a link end vent on an adjacent module when the modules are intercalated.

2. A belt module, comprising:
   a) an intermediate section having a top surface;
   b) a first plurality of link ends having opposed side walls providing the first link ends with a first transverse thickness connected to the intermediate section at a first proximal portion and extending from the intermediate section in a direction of belt travel to a first distal portion at the link ends, wherein the first link ends have a first opening through the thickness between and to the opposed side walls, the first opening being disposed transverse to the direction of belt travel;
   c) a second plurality of link ends having opposed side walls providing the second link ends with a second transverse thickness connected to the intermediate section at a second proximal portion and extending from the intermediate section in a direction opposite to the first link ends to a second distal portion at the link ends, wherein the second link ends have a second opening through the thickness between and to the opposed side walls, the second opening being disposed transverse to the direction of belt travel; and,
   d) wherein one of the first plurality of link ends, the second plurality of link ends, and the intermediate section, has a vent defined therein; wherein at least one of the link ends has a side wall with a vent disposed thereon, the vent comprising a depression formed in an outer surface of the side wall, the depression extending from a top surface to a bottom surface of the module.

3. A modular belt, comprising:

a) a plurality of belt modules having an intermediate section with a top surface; a first plurality of link ends having opposed side walls providing the first link ends with a first transverse thickness connected to the intermediate section at a first proximal portion and extending from the intermediate section in a direction of belt travel to a first distal portion at the link ends, wherein the first link ends each have a first opening through the thickness and extending to and between the opposed side walls, the first opening being disposed transverse to the direction of belt travel; and a second plurality of link ends having opposed side walls providing the second link ends with a second transverse thickness connected to the intermediate section at a second proximal portion and extending from the intermediate section in a direction opposite to the first link ends to a second distal portion at the link ends, wherein the second link ends have a second opening through the thickness between and to the opposed side walls, the second opening being disposed transverse to the direction of belt travel; wherein one of the first plurality of link ends, the second plurality of link ends and intermediate section has a vent defined therein; and, b) a pivot rod disposed through the transverse openings in the first and second link ends of adjacent belt modules, wherein the intercalated link ends provide the modular belt with a continuous upper conveying surface of the top surfaces of intercalated belt modules; wherein a portion of the intermediate section bordering a space between adjacent link ends on the same module has a vent defined therein such that the vent is capable of aligning with a link end vent on an adjacent module when the modules are intercalated.

4. A modular belt, comprising:

a) a plurality of belt modules having an intermediate section with a top surface; a first plurality of link ends having opposed side walls providing the first link ends with a first transverse thickness connected to the intermediate section at a first proximal portion and extending from the intermediate section in a direction of belt travel to a first distal portion at the link ends, wherein the first link ends each have a first opening through the thickness and extending to and between the opposed side walls, the first opening being disposed transverse to the direction of belt travel; and a second plurality of link ends having opposed side walls providing the second link ends with a second transverse thickness connected to the intermediate section at a second proximal portion and extending from the intermediate section in a direction opposite to the first link ends to a second distal portion at the link ends, wherein the second link ends have a second opening through the thickness between and to the opposed side walls, the second opening being disposed transverse to the direction of belt travel; wherein one of the first plurality of link ends, the second plurality of link ends and intermediate section has a vent defined therein; and, b) a pivot rod disposed through the transverse openings in the first and second link ends of adjacent belt modules, wherein the intercalated link ends provide the modular belt with a continuous upper conveying surface of the top surfaces of intercalated belt modules; wherein at least one of the link ends has a side wall with a vent disposed thereon, the vent comprising a depression formed in an outer surface of the side wall, the depression extending from a top surface to a bottom surface of the module.

5. A method of configuring a modular belt, comprising:

providing a plurality of belt modules having an intermediate section with a top surface; a first plurality of link ends having opposed side walls providing the first link ends with a first transverse thickness connected to the intermediate section at a first proximal portion and extending from the intermediate section in a direction of belt travel to a first distal portion at the link ends, wherein the first link ends each have a first opening through the thickness and extending to and between the opposed side walls, the first opening being disposed transverse to the direction of belt travel; and a second plurality of link ends having opposed side walls providing the second link ends with a second transverse thickness connected to the intermediate section at a second proximal portion and extending from the intermediate section in a direction opposite to the first link ends to a second distal portion at the link ends, wherein the second link ends have a second opening through the thickness between and to the opposed side walls, the second opening being disposed transverse to the direction of belt travel; wherein one of the first plurality of link ends, the second plurality of link ends, and the intermediate section, has a vent defined therein; and, placing a pivot rod through the transverse openings in the first and second link ends of adjacent belt modules, wherein the intercalated link ends provide the modular belt with a continuous upper conveying surface of the top surfaces of intercalated belt modules; wherein a portion of the intermediate section bordering a space between adjacent link ends on the same module has a vent defined therein such that the vent is capable of aligning with a link end vent on an adjacent module when the modules are intercalated.

* * * * *